(12) United States Patent
Swanberg et al.

(10) Patent No.: US 8,088,450 B2
(45) Date of Patent: Jan. 3, 2012

(54) AUTOMATED WING PAINTING SYSTEM

(75) Inventors: Jeffery P. Swanberg, Bonney Lake, WA (US); Kenneth R. Brewer, Arlington, WA (US); Steven J. Kakalecik, Marysville, WA (US); Cody S. Dunham, Mount Vernon, WA (US); Robert J. Stouffer, Kent, WA (US); Martin F. Derouin, Mount Vernon, WA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 12/403,956

(22) Filed: Mar. 13, 2009

(65) Prior Publication Data

US 2010/0233373 A1    Sep. 16, 2010

(51) Int. Cl.
*B05D 7/00* (2006.01)
(52) U.S. Cl. ............. 427/402; 427/421.1; 427/424; 427/427.2
(58) Field of Classification Search ........... 427/402, 427/421.1, 424, 427.2
See application file for complete search history.

(56) References Cited

U.S. PATENT DOCUMENTS

| 5,020,677 | A | 6/1991 | Wirth et al. | |
|---|---|---|---|---|
| 5,248,341 | A * | 9/1993 | Berry et al. | 118/698 |
| 5,858,111 | A | 1/1999 | Marrero | |
| 5,979,001 | A | 11/1999 | Marrero | |
| 6,134,734 | A | 10/2000 | Marrero | |
| 6,477,730 | B1 | 11/2002 | Marrero | |
| 7,350,890 | B2 | 4/2008 | Baird et al. | |
| 2008/0047486 | A1 | 2/2008 | Herre et al. | |

FOREIGN PATENT DOCUMENTS

| GB | 249463 A | 7/1926 |
|---|---|---|
| GB | 03022532 A2 | 3/2003 |

OTHER PUBLICATIONS

PCT Search report for application PCT/US2010/026855 dated Jun. 29, 2010.

* cited by examiner

*Primary Examiner* — Eisa Elhilo
(74) *Attorney, Agent, or Firm* — Yee & Associates, P.C.; Dennis R. Plank

(57) ABSTRACT

An automated finishing system comprises a lift system and a number of robots. The lift system is capable of positioning a wing in a substantially horizontal position. The number of robots is capable of applying a number of finishing compounds to at least one of an interior of the wing and an exterior of the wing, while the wing remains in the substantially horizontal position.

30 Claims, 10 Drawing Sheets

AUTOMATED WING PAINTING SYSTEM

BACKGROUND INFORMATION

1. Field:

The present disclosure relates generally to manufacturing structures and, in particular, to a method and apparatus for painting structures. Still more particularly, the present disclosure relates to a method and apparatus for painting a wing for an aircraft.

2. Background:

In manufacturing aircraft, machines, tools, human labor, materials, and/or other suitable items may be used to assemble structures. These structures may include, for example, without limitation, a wing, a fuselage, a rudder, or some other suitable structure.

Part of the manufacturing process includes finishing structures prior to assembly. For example, a wing of an aircraft may be painted prior to attaching the wing to a fuselage. The painting of a wing may occur for a number of different reasons. For example, the exterior of the wing may be painted to provide better airflow, for aesthetic reasons, to prevent corrosion, and/or for other purposes. The interior of a wing also may be painted. This painting may be used to reduce noise, prevent corrosion, increase inspectability, and/or for other suitable purposes.

As another example, in finishing a wing, other types of corrosion-resistant compounds may be applied to the wing in addition to paint. A waxy oil also may be applied to the wing. This waxy oil fills seams, crevices, and/or other small gaps. The waxy oil soaks into these features and prevents and/or reduces water from entering the wing from these features.

Currently, the manufacturing processes for finishing a wing may require changing the orientation and location of a wing during painting. In some cases, the size of the wing may require the wing to be painted and cleaned in several different booths and to be changed in orientation several times. During this process, the wing starts out in a horizontal orientation, moves to another booth into a vertical orientation, and moves to a third booth back into a horizontal orientation.

With this type of process, the wing is placed in a first paint booth in the horizontal orientation. In this position, portions of the wing, such as the front spar, the rear spar, and the leading edge canopy are painted in the first booth.

Thereafter, the wing is removed from the first booth and placed into a vertical orientation in a second booth. A vertical position provides access, ergonomic benefits, and safety benefits. In this booth, operations, such as sanding, masking, and painting the sides of the wing, are performed. Further, various graphics, tail numbers, maintenance markings, and/or other suitable designs may be painted onto the wing.

The wing is then removed from the second booth and placed into a horizontal orientation in a third booth. In this booth, various materials for corrosion protection may be applied to fill in crevices and seams in the wing.

This type of process requires labor, time, space, and materials. For example, moving the wing from a horizontal orientation to a vertical orientation takes a number of hours. Further, the time needed to schedule a crane for a move and have the crane arrive also may take a number of hours. As a result, the process of scheduling a crane, having the crane and crane crew arrive, and moving the wing may take around eight hours.

It would be advantageous to have a method and apparatus that takes into account one or more of the issues discussed above, as well as possibly other issues.

SUMMARY

In one advantageous embodiment, an automated finishing system comprises a lift system and a number of robots. The lift system is capable of positioning a wing in a substantially horizontal position. The number of robots is capable of applying a number of finishing compounds to at least one of an interior of the wing and an exterior of the wing, while the wing remains in the substantially horizontal position.

In another advantageous embodiment, an apparatus comprises a lift system and a number of robots. The lift system is capable of positioning an object in a selected orientation. The number of robots is capable of applying a number of finishing compounds to at least one of an interior of the object and an exterior of the object, while the object remains in the selected orientation.

In yet another advantageous embodiment, a method is present for processing an object. The object is positioned in a selected orientation using a lift system. A number of finishing compounds are applied to at least one of an interior of the object and an exterior of the object using a number of robots, while the object remains in the selected orientation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
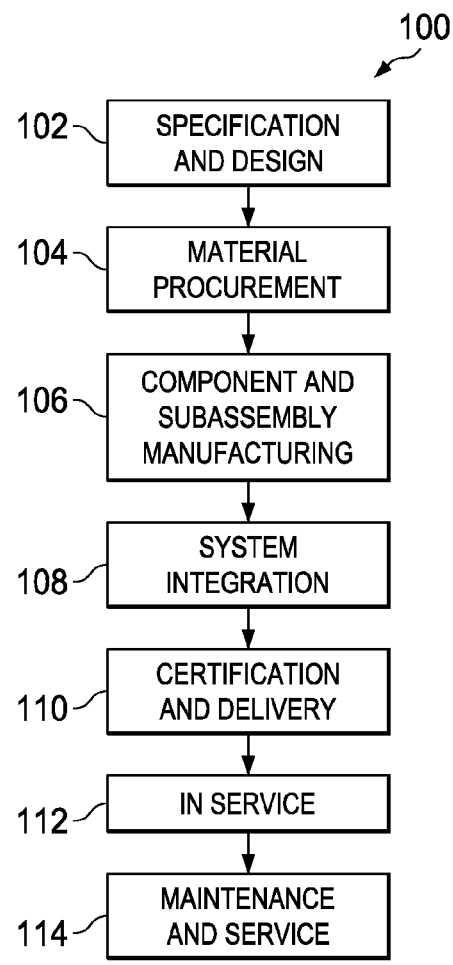
FIG. 1 is a diagram illustrating an aircraft manufacturing and service method in accordance with an advantageous embodiment.
Figure 2:
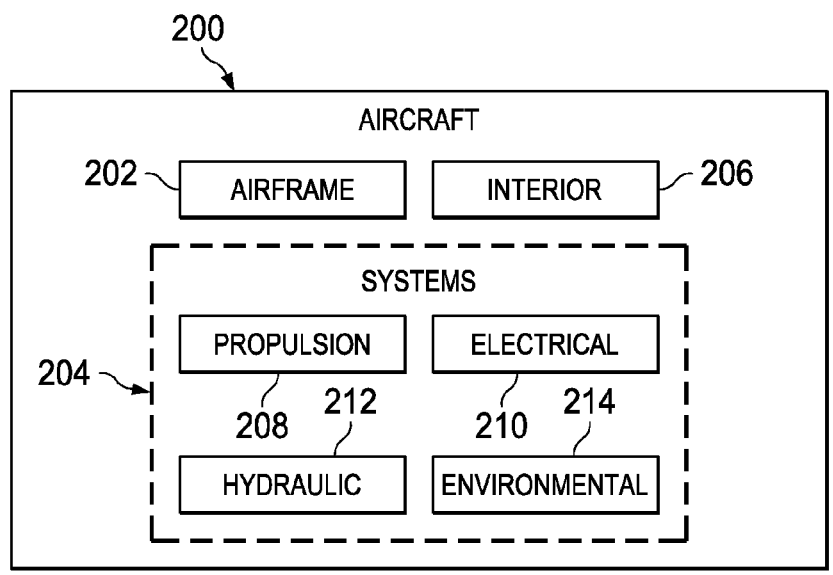
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As a specific example, the different advantageous embodiments may be used to finish parts for aircraft 200 during component and subassembly manufacturing 106. For example, the different advantageous embodiments may be used to finish parts, such as wings, fuselages, rudders, and/or other suitable components for aircraft 200. Additionally, the different advantageous embodiments also may be employed during maintenance and service 114 to refinish wings, finish replacement wings, and perform other suitable finishing processes.

The different advantageous embodiments recognize and take into account a number of different factors and/or issues. For example, currently used manufacturing processes may require increased expense and time because of the repositioning of the wing. Further, the different advantageous embodiments also recognize that additional space may be required to reduce the amount of time needed to finish a wing.

Even with increasing the number of booths and with increased space, the different advantageous embodiments recognize and take into account that many of the operations performed to finish the wing in current finishing environments must be performed sequentially and cannot be combined. Further, the different advantageous embodiments recognize and take into account that many operations are repeated in the different orientations.

For example, operations may be repeated when the wing is painted and cleaned in three different booths and in three different positions. The different advantageous embodiments recognize and take into account that it would be advantageous to combine operations rather than performing them in sequence with respect to finishing the aircraft.

Thus, the different advantageous embodiments provide a method and apparatus for finishing an aircraft. In the illustrative examples, an apparatus comprises a lift system and a number of robots. The lift system is capable of positioning an object in a selected orientation. The number of robots is capable of applying a number of finishing compounds to at least one of an interior of the object and an exterior of the object while the object remains in the selected orientation.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. A number, as used herein, when referring to an item, refers to one or more items. For example, a number of robots is one or more robots.

Figure 3:
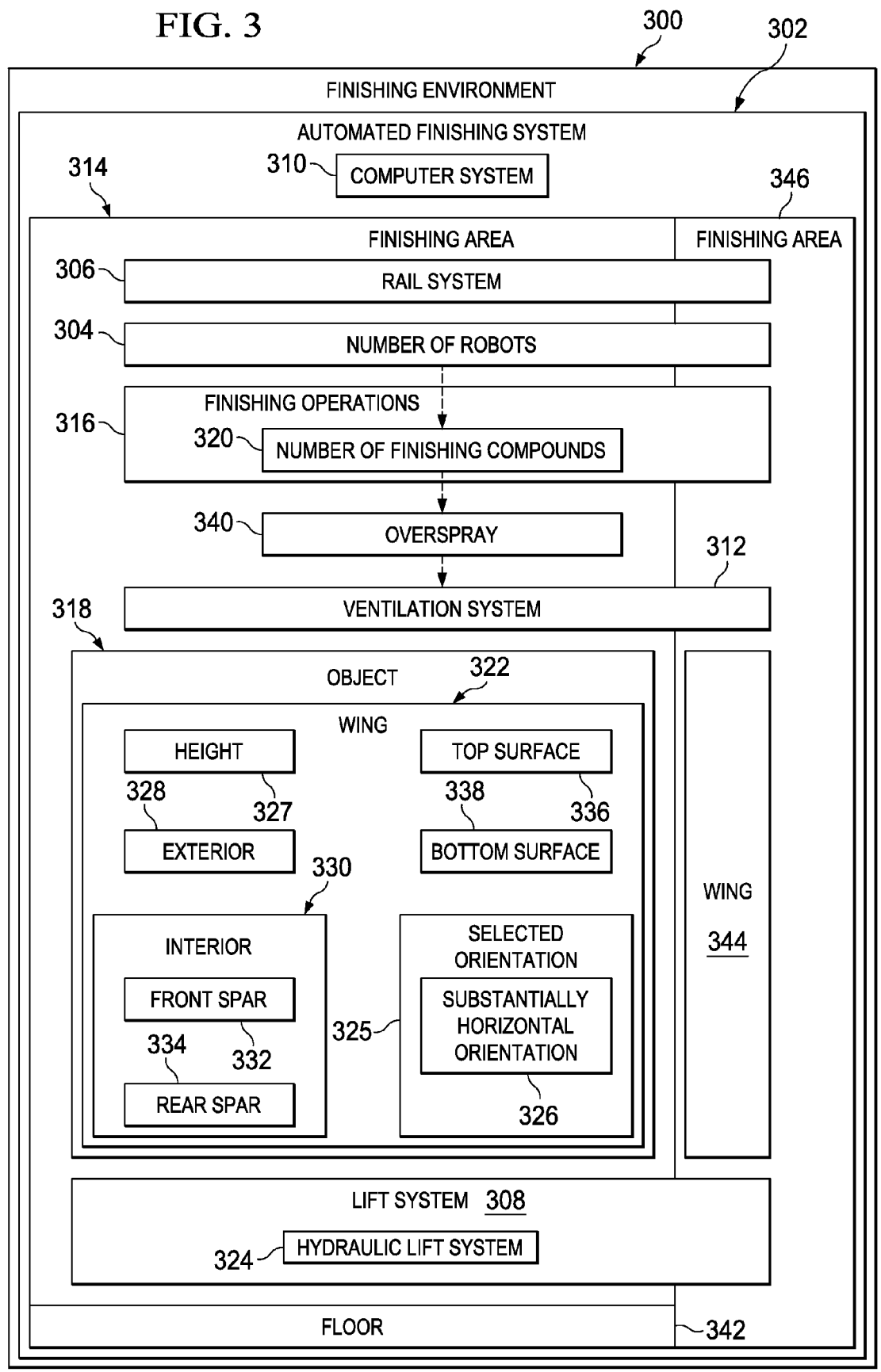
FIG. 3 is a diagram of a finishing environment in accordance with an advantageous embodiment.

Turning now to FIG. 3, a diagram of a finishing environment is depicted in accordance with an advantageous embodiment. In this illustrative example, finishing environment 300 includes automated finishing system 302. Automated finishing system 302 may include number of robots 304, rail system 306, lift system 308, computer system 310, and ventilation system 312.

Number of robots 304, rail system 306, lift system 308, and ventilation system 312 may be located in finishing area 314. Finishing area 314 is a location in which finishing operations 316 are performed. Computer system 310 controls number of robots 304, lift system 308, and ventilation system 312 to perform finishing operations 316 in these illustrative examples.

Number of robots 304 may move around finishing area 314. In these illustrative examples, number of robots 304 move within finishing area 314 on rail system 306.

Number of robots 304 perform finishing operations 316 on object 318. In these illustrative examples, finishing operations 316 may include, for example, without limitation, applying number of finishing compounds 320 to object 318. Number of finishing compounds 320 may include, for example, without limitation, a top coat paint, a primer, a waxy oil, and/or some other suitable compound.

In these illustrative examples, a primer is a paint used to provide a primer layer for other paint coats or compounds. A top coat paint is a paint used to obtain the desired aesthetic look for object 318. The waxy oil is a finishing compound that is used to fill crevices and/or seams to keep water out of the interior of object 318.

Finishing operations 316 may also include, for example, without limitation, cleaning, sanding, masking, and/or other suitable operations needed to finish object 318.

In these illustrative examples, object 318 takes the form of wing 322. In these illustrative examples, lift system 308 takes the form of hydraulic lift system 324.

Hydraulic lift system 324 may position wing 322 in selected orientation 325. Selected orientation 325 may be with respect to a plurality of axes. For example, selected orientation 325 may be with respect to three axes in a three-dimensional space. In these illustrative examples, selected orientation 325 is in substantially horizontal orientation 326.

Hydraulic lift system 324 is capable of changing height 327 of wing 322 without changing selected orientation 325. In other words, height 327 of wing 322 may be changed without moving wing 322 out of substantially horizontal orientation 326. The change in height 327 may be performed during the performing of finishing operations 316. This change in height 327 of wing 322 allows number of robots 304 to reach different parts of wing 322.

For example, wing 322 has exterior 328 and interior 330. In interior 330, wing 322 includes components, such as front spar 332 and rear spar 334, on which number of finishing compounds 320 may be applied. Further, wing 322 also has top surface 336 and bottom surface 338.

Number of robots 304 may perform finishing operations 316 on exterior 328 and interior 330 of wing 322 simultaneously in some illustrative examples. The positioning of wing 322 by hydraulic lift system 324 may provide number of robots 304 a capability to reach these different parts of wing 322, while performing finishing operations 316.

In these illustrative examples, number of robots 304 may apply number of finishing compounds 320 in a manner that allows different finishing compounds within number of finishing compounds 320 to be blended. For example, one finishing compound may be applied at one thickness by a robot within number of robots 304, while another finishing compound within number of finishing compounds 320 may be applied by another robot within robots 304 at another thickness. A location at which these two finishing compounds meet may occur such that the thicknesses are blended. This type of blending may be performed by number of robots 304 in a manner without requiring masking.

While applying number of finishing compounds 320, number of robots 304 may generate overspray 340. Overspray 340 occurs when a portion of number of finishing compounds 320 do not contact and/or stick to wing 322 when applied by number of robots 304.

The different advantageous embodiments use ventilation system 312 to pull overspray 340 away from wing 322. In these illustrative examples, overspray 340 is pulled downward into floor 342 of finishing area 314 by ventilation system 312. Ventilation system 312 generates a flow of air capable of pulling overspray 340 away from wing 322 in these illustrative examples. Number of robots 304 generates overspray 340 at angles and/or directions that allow for ventilation system 312 to pull overspray 340 away from wing 322.

With these and other features, the different advantageous embodiments provide a capability to perform finishing operations 316 without changing the position of wing 322 to different orientations. In other words, movement of wing 322 from a horizontal position, to a vertical position, and back to a horizontal position may be avoided using automated finishing system 302.

Automated finishing system 302 allows for wing 322 to remain in the same position during performance of finishing operations 316. As a further feature provided by one or more of the different advantageous embodiments, automated finishing system 302 requires only one location or booth within finishing area 314 to perform finishing operations 316 on a second wing, such as wing 344.

Further, in some advantageous embodiments, finishing operations 316 may be performed on wing 344 using number of robots 304. With this type of embodiment, rail system 306 extends into finishing area 346 in which wing 344 is located.

Other components, such as hydraulic lift system 324 and ventilation system 312, also extend and/or present within finishing area 346. With this type of implementation, number of robots 304 may perform finishing operations 316 on wing 344. Finishing operations 316 may be performed on wing 322 and wing 344 simultaneously or sequentially in a manner that reduces the amount of time needed to finish these parts.

The illustration of finishing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, automated finishing system 302 may include another number of robots, another rail system, another ventilation system, and/or other suitable components to finish additional wings. Further, in other advantageous embodiments, rail system 306 may be unnecessary if number of robots 304 are mobile robots. In other words, number of robots 304 may have wheels, tracks, legs, and/or other suitable features needed to move without the use of rail system 306.

As another illustrative example, although finishing operations 316 may be performed by number of robots 304, some of finishing operations 316 may be performed using human operators. For example, plugging open holes and masking adjustment surfaces, fittings, bearings, and/or other suitable components may be performed by human operators instead of by number of robots 304.

In some advantageous embodiments, computer system 310 may be located in finishing area 314. In yet other advantageous embodiments, computer system 310 may be located remotely to finishing area 314 and communicates with the other components through a network that may contain wires or wireless connections.

In yet other advantageous embodiments, lift system 308 may take other forms than hydraulic lift system 324. For example, lift system 308 may be an entirely mechanical lift system. Further, in these illustrative examples, finishing operations 316 have been described with wing 322 in a stationary location. In other advantageous embodiments, wing 322 may move in finishing area 314, while finishing operations 316 are performed on wing 322. With this type of implementation, wing 322 may be placed on a rail system and/or some other type of transport. Different types of operations within finishing operations 316 may be performed by number of robots 304, while finishing operations 316 are performed.

Figure 4:
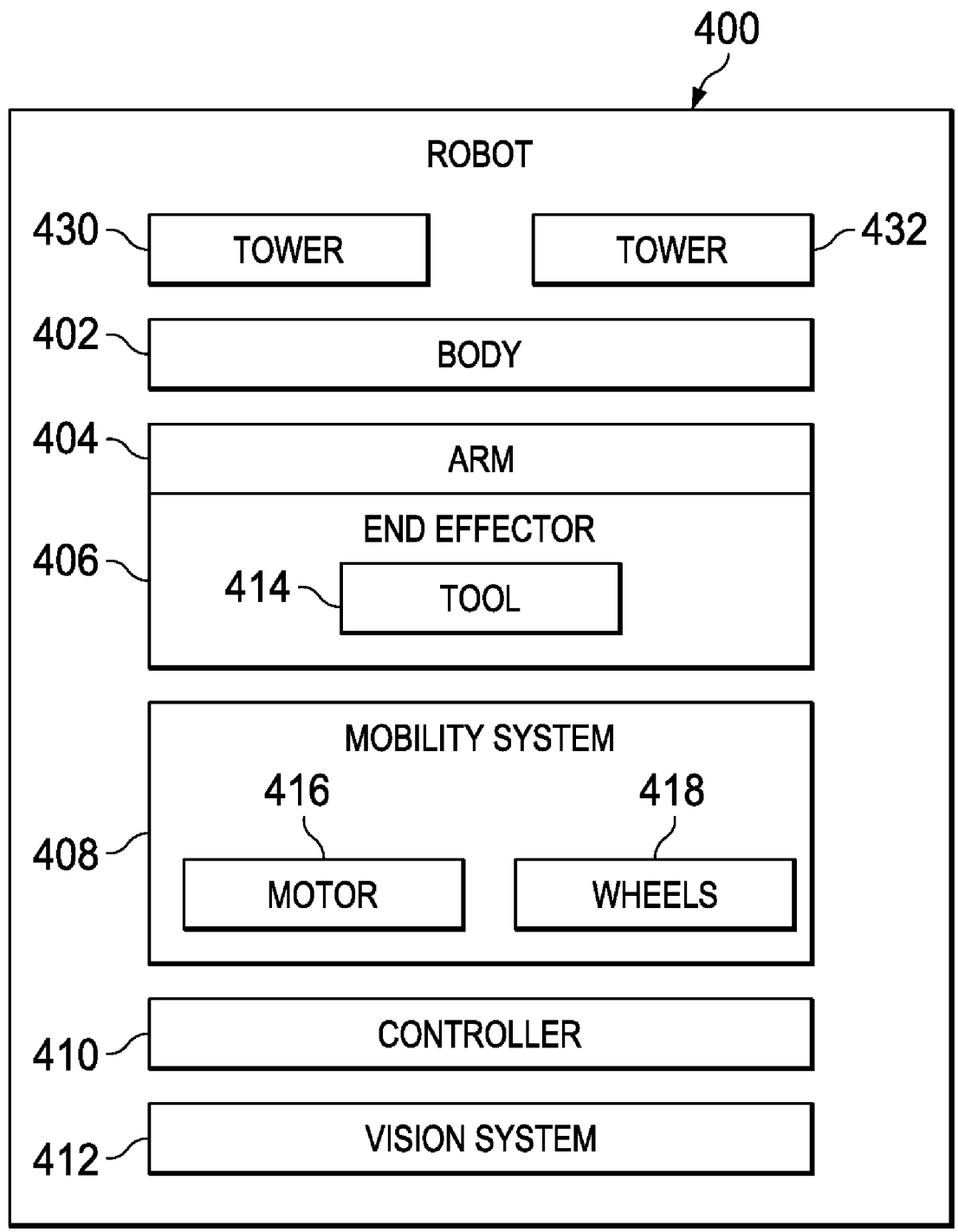
FIG. 4 is a diagram of a robot in accordance with an advantageous embodiment.

Turning now to FIG. 4, a diagram of a robot is depicted in accordance with an advantageous embodiment. In this example, robot 400 is an example of one manner in which number of robots 304 in FIG. 3 may be implemented.

In this illustrative example, robot 400 includes body 402, arm 404, end effector 406, mobility system 408, controller 410, vision system 412, and/or other suitable components.

Body 402 provides a structure and/or housing for which different components may be located on and/or in robot 400. In these examples, arm 404 is moveably attached to body 402 and has end effector 406. Arm 404 and/or end effector 406 may be moveable around three different axes. End effector 406 may have tool 414. In these illustrative examples, tool 414 may be, for example, without limitation, an air gun sprayer, a high-volume low-pressure sprayer, a low-volume low-pressure sprayer, an electrostatic spraying device, an airless spray gun, a sanding device, and/or some other suitable type of tool. End effector 408 and/or tool 414 provide robot 400 a capability to perform finishing operations in these illustrative examples.

Mobility system 408 provides robot 400 a capability to move when performing finishing operations. In these illustrative examples, mobility system 408 provides robot 400 a capability to move on rails, such as those found in rail system 306 in FIG. 3. Mobility system 408 may have motor 416 and wheels 418. Motor 416 may turn wheels 418 in a manner that causes robot 400 to move along a rail in rail system 306.

Vision system 412 provides robot 400 a capability to identify the position of objects and/or other information needed to perform finishing operations. For example, vision system 412 may provide robot 400 a capability to view a part or portion of a part, such as a wing, on which finishing operations are performed.

In these examples, vision system 412 may be, for example, without limitation, a camera, a data processing system, and/or software capable of identifying the positions of objects and/or other information needed to perform finishing operations.

Controller 410 may execute programs and/or processes to control the operation of robot 400. In these examples, controller 410 may control arm 404, end effector 406, mobility system 408, and vision system 412. Vision system 412 provides input for controller 410 in these illustrative examples. Controller 410 may communicate with a computer system such as, for example, computer system 310 in FIG. 3 to perform finishing operations.

In these illustrative examples, robot 400 may be implemented using, for example, without limitation, Flex Painter model IRB5500 as produced by Asea Brown Boveri (ABB), Limited. The illustration of robot 400 is not meant to imply physical or architectural limitations to the manner in which different advantageous embodiments may be implemented. In some advantageous embodiments, other components may be present in addition to, or in place of, the ones illustrated. In yet other advantageous embodiments, some of the components may be omitted.

For example, body 402 of robot 400 may be mounted on a lift system. In other advantageous embodiments, a lift, such as tower 430 or tower 432 in FIG. 4 may be implemented as part of robot 400 to provide robot 400 a capability to move body 402 upwards and downwards. This type of movement provides additional reach for robot 400. The use of a lift may provide robot 400 a capability to perform operations both on the top side, bottom side, and/or interior of a wing.

Figure 5:
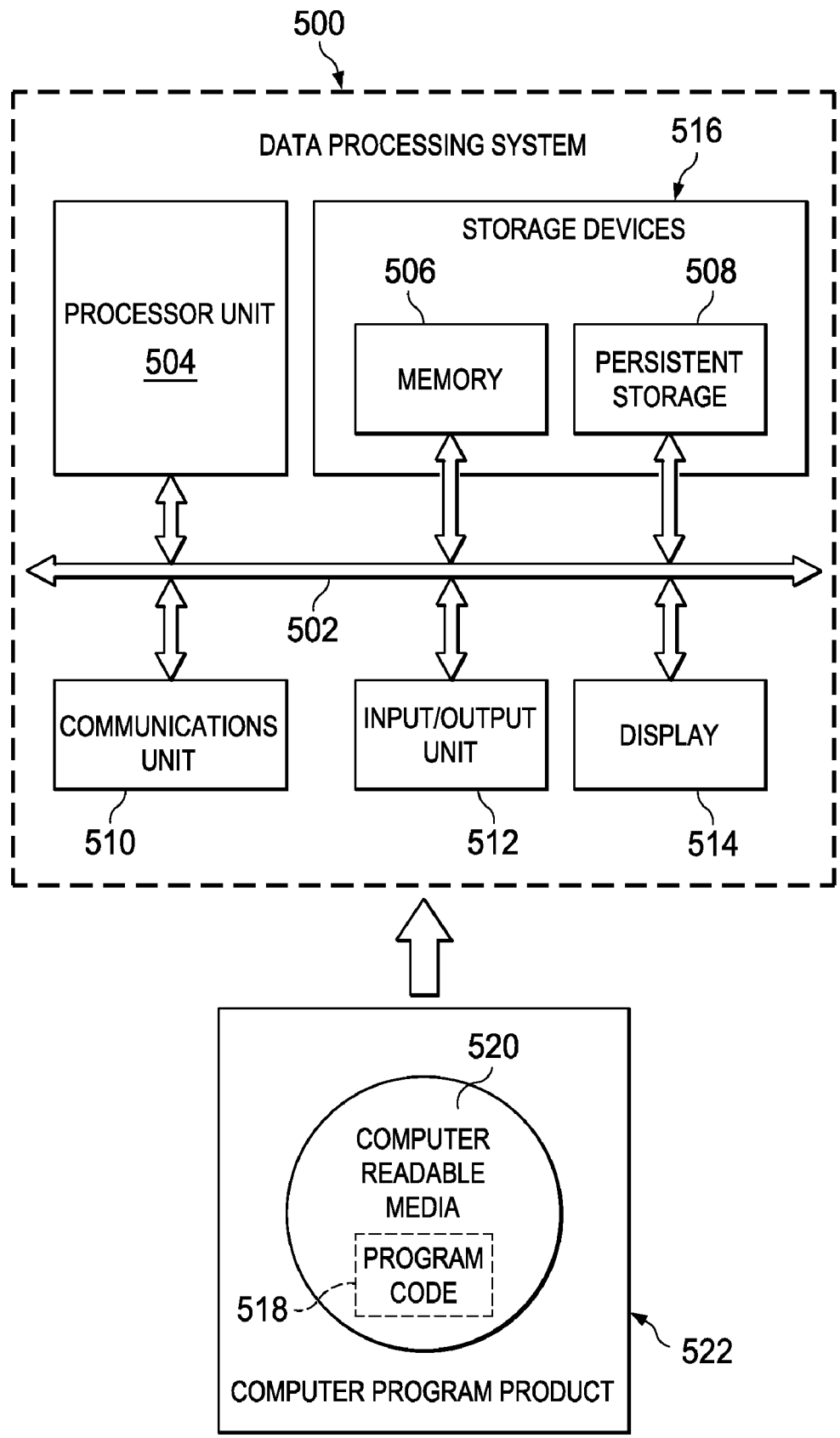
FIG. 5 is a diagram of a data processing system in accordance with an advantageous embodiment.

Turning now to FIG. 5, a diagram of a data processing system is depicted in accordance with an illustrative embodiment. Data processing system 500 is an example of a data processing system that may be used to implement a controller, such as controller 410 in FIG. 4. Additionally, data processing system 500 also may be used to implement one or more computers within computer system 310 in finishing environment 300 in FIG. 3.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example without limitation, data, program code in functional form, and/or other suitable information either on a temporary basis and/or a permanent basis. Memory 506, in these examples, may be, for example, a random access memory or any other suitable volatile or non-volatile storage device.

Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications and/or programs may be located in storage devices 516, which are in communication with processor unit 504 through communications fabric 502. In these illustrative examples the instruction are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples.

Program code 518 may be transferred to data processing system 500 from computer readable media 520 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

Figure 6:
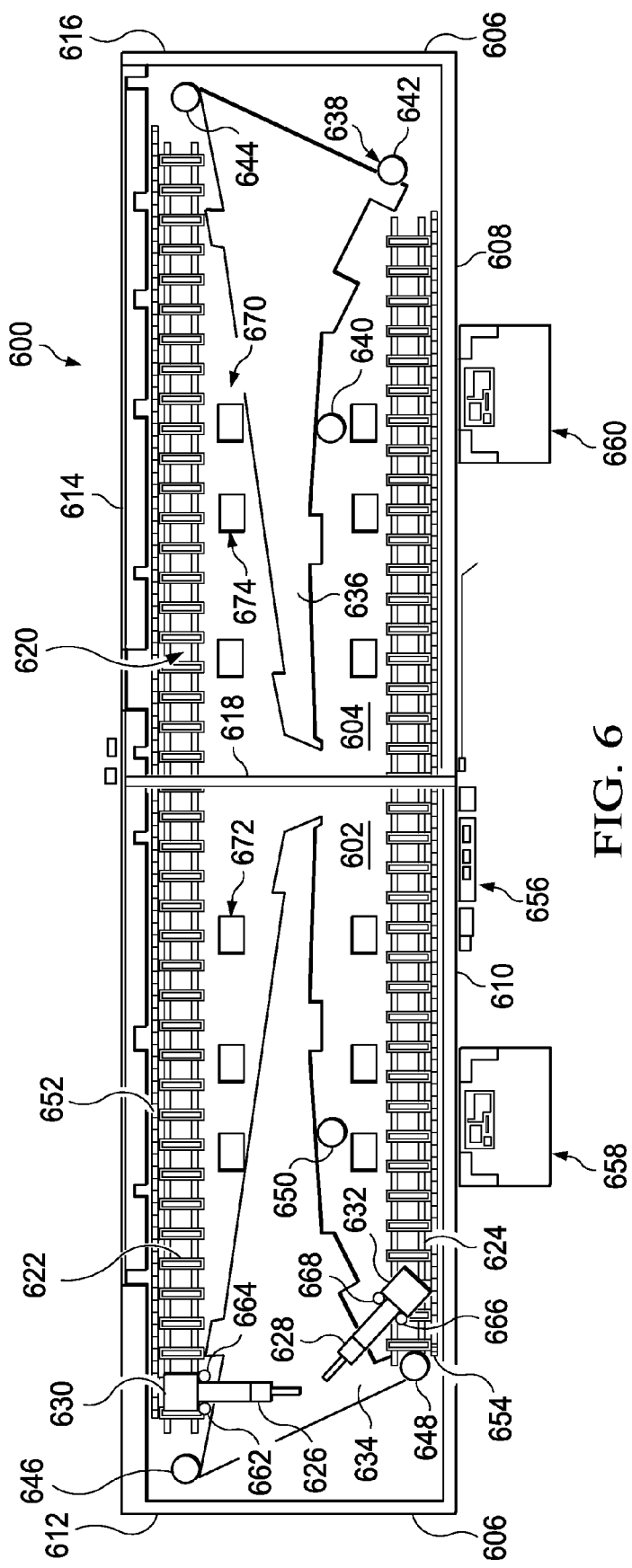
FIG. 6 is a diagram of an automated finishing system in accordance with an advantageous embodiment.

With reference now to FIG. 6, a diagram of an automated finishing system is depicted in accordance with an advantageous embodiment. In this illustrative example, automated finishing system 600 is an example of one implementation for automated finishing system 302 in finishing environment 300 in FIG. 3.

In this example, automated finishing system 600 encompasses finishing area 602 and finishing area 604. These finishing areas take the form of booth 606 and booth 608. These booths are formed by walls 610, 612, 614, 616, and 618. Booth 606 and 608 may be covered or open at the top in these illustrative examples.

Rail system 620 includes rail 622 and rail 624. In this depicted example, robot 626 moves along rail 622, and robot 628 moves along rail 624. Rail 622 extends through wall 618 into both finishing areas 602 and 604. Rail 624 also extends through wall 618 into both finishing areas 602 and 604.

Robot 626 and robot 628 may perform finishing operations on wing 634 and wing 636 in finishing areas 602 and 604. Robot 626 and robot 628 are capable of moving between finishing areas 602 and 604 on rails 622 and 624.

In these examples, lift system 638 may position wing 634 and wing 636 in a substantially horizontal orientation. Lift system 638 may lift and lower wing 634 and wing 636 independently of each other in a substantially horizontal orientation in these illustrative examples.

In this illustrative example, lift system 638 includes jacks 640, 642, 644, 646, 648, and 650. These jacks may be attached to wings 634 and 636. Jacks 640, 642, and 644 are used to position wing 636, while jacks 646, 648, and 650 are used to position wing 634.

Jacks 640, 642, 644, 646, 648, and 650 are lifting mechanisms. Each of these jacks may change height upward or downward. In the depicted examples, these jacks are hydraulic jacks that may move to change the position of wing 634 and/or wing 636.

Jacks are mechanical devices that may be used to lift loads. These jacks may employ a screw thread or a hydraulic cylinder to apply high forces to lift loads. Of course, any type of device capable of lifting loads may be used in addition to, or in place of, jacks in these examples.

In these illustrative examples, robot 626 is mounted on tower 630, and robot 628 is mounted on tower 632. Tower 630 and tower 632 may move on rail 622 and rail 624, respectively. Further, tower 630 and tower 632 may change the elevation height of robots 626 and 628. This change in height may allow the robots to perform finishing operations on different sides of wing 634 and 636.

In this illustrative example, automated finishing system 600 also has elevated cat track 652 and elevated cat track 654. Elevated cat tracks 652 and 654 are structures that hold electrical wires, computer wires, paint and fluid lines, air hoses, and/or other such components at an elevated position. Elevated cat tracks 652 and 654 prevent these components from getting in the path of the robot as it moves.

In these illustrative examples, robot controller 656 may control the operation of robot 626 and robot 628 in performing finishing operations on wings 634 and 636. Robot controller 656 may be implemented using a computer or some other type of data processing system such as, for example, data processing system 500 in FIG. 5. In this illustrative example, operator console 658 and operator console 660 are present on wall 604. Operator consoles 658 and 660 are control stations at which an operator may select a paint or alignment program, monitor current operations, view video of operations, and/or perform other tasks.

In these examples, paint pots 662 and 664 are present on tower 630, while paint pots 666 and 668 are present on tower 632. These paint pots may contain a number of different finishing compounds, such as a top coat paint, a primer, a corrosion inhibiting compound, or some other suitable finishing compound.

Automated finishing system 600 also has ventilation system 670. In these examples, vents 672 in finishing area 602 and vents 674 in finishing area 604 are used to draw overspray away from wing 634 and wing 636, respectively, that may occur while robot 626 and robot 628 apply a number of finishing compounds to wing 634 and wing 636.

Figure 7:
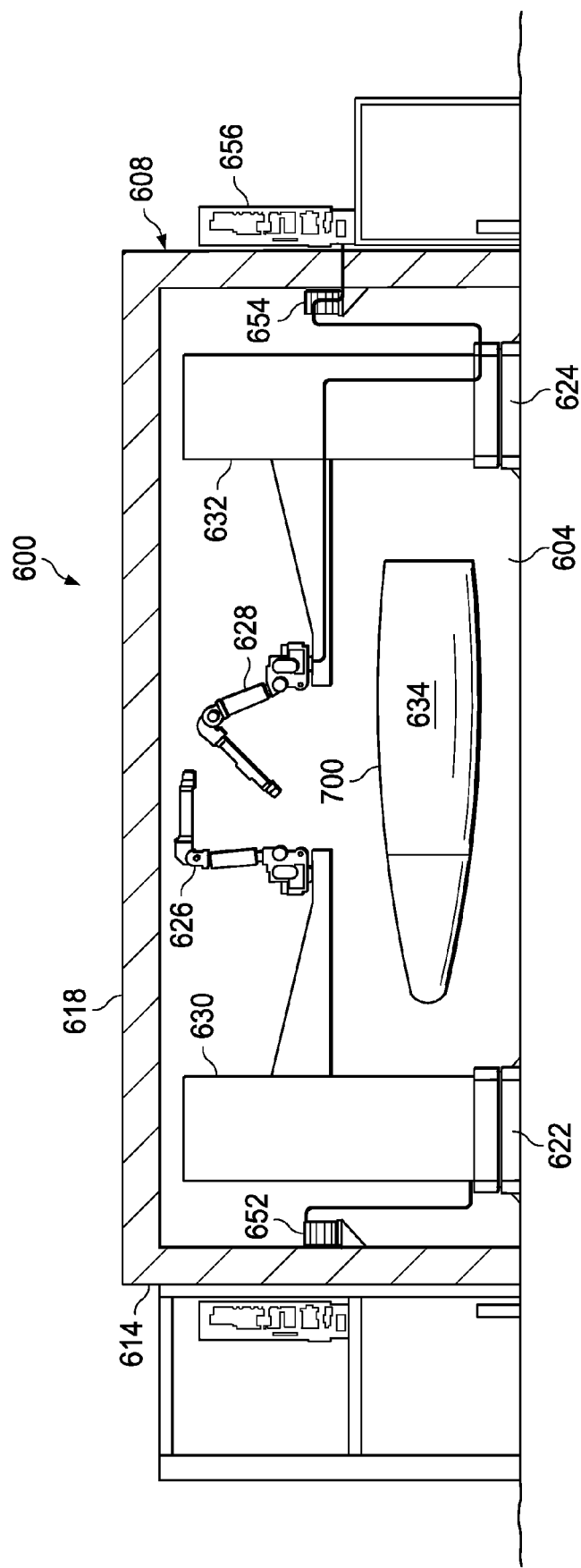
FIG. 7 is a diagram of a side view of an automated finishing system in accordance with an advantageous embodiment.

Turning now to FIG. 7, a side view of an automated finishing system is depicted in accordance with an advantageous embodiment. In this example, a side view of automated finishing system 600 is depicted. As can be seen in this illustrative example, robot 626 and robot 628 are elevated over upper surface 700 of wing 634. Robots 626 and 628 are elevated over surface 700 by tower 630 and tower 632, respectively.

Figure 8:
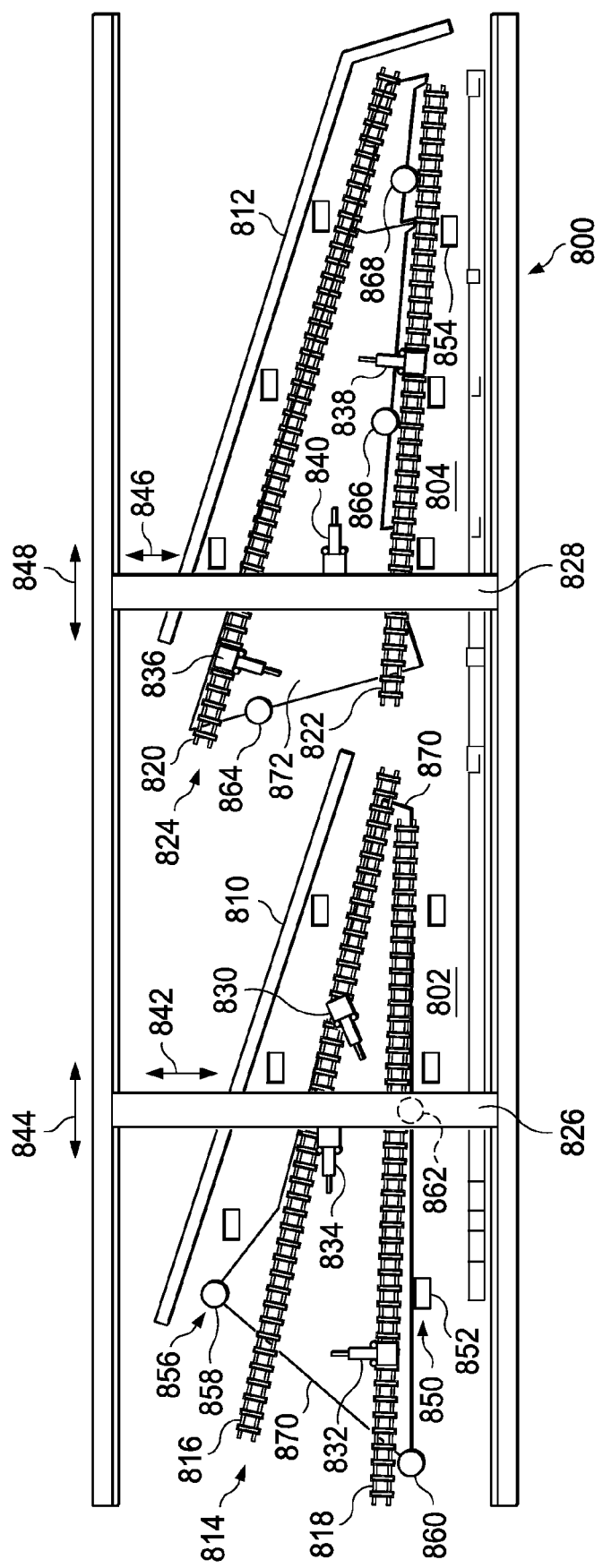
FIG. 8 is a diagram of an automated finishing system in accordance with an advantageous embodiment.

Turning now to FIG. 8, a diagram of an automated finishing system is depicted in accordance with an advantageous embodiment. In this illustrative example, automated finishing system 800 is an example of another implementation for automated finishing system 302 in FIG. 3.

In this illustrative example, wall 810 encompasses finishing area 802, while wall 812 encompasses finishing area 804. Rail system 814, in this example, contains rails 816, 818, 820, and 822. Rail 816 and rail 818 are located in finishing area 802, while rail 820 and rail 822 are located in finishing area 804.

Rail system 814 also includes bridge system 824. Bridge system 824 contains moveable bridge 826 and moveable bridge 828. Moveable bridge 826 moved over finishing area 802, while moveable bridge 828 moves over finishing area 804.

In these illustrative examples, robots 830, 832 and 834 perform finishing operations within finishing area 802, while robots 836, 838, and 840 perform finishing operations in finishing area 804. Robot 830 moves along rail 816, while robot 832 moves along rail 818. Robot 834 moves on moveable bridge 826. For example, robot 834 may move along moveable bridge 826 in the direction of arrow 842, while moveable bridge 826 may move along the direction of arrow 844.

Robot 836 moves along rail 820, while robot 838 moves along rail 822. Robot 840 is moveably located on moveable bridge 828. In this example, robot 840 may move along the direction of arrow 846, while moveable bridge 828 may move along the direction of arrow 848.

Additionally, automated finishing system 800 has ventilation system 850, which has vents 852 in finishing area 802 and vents 854 in finishing area 804. In this illustrative example, automated finishing system 800 also has lift system 856. Lift system 856, in this example, includes jacks 858, 860, and 862 located in finishing area 802, and jacks 864, 866, and 868 in finishing area 804.

Jacks 858, 860, and 862 may be used to position wing 870 in finishing area 802, while jacks 864, 866, and 868 may position wing 872 in finishing area 804.

In this configuration, robots 830, 832, 836, and 838 may perform finishing operations on the lower side of wings 870 and 872 in these illustrative examples. Robots 834 and 840 on moveable bridges 826 and 828, respectively, perform finishing operations on the upper side of wings 870 and 872. Additionally, robots 830, 832, 836 and 838 perform finishing operations on interior portions of wings 870 and 872. In other configurations, the different robots may perform different operations on different portions of wings 870 and 872.

Figure 9:
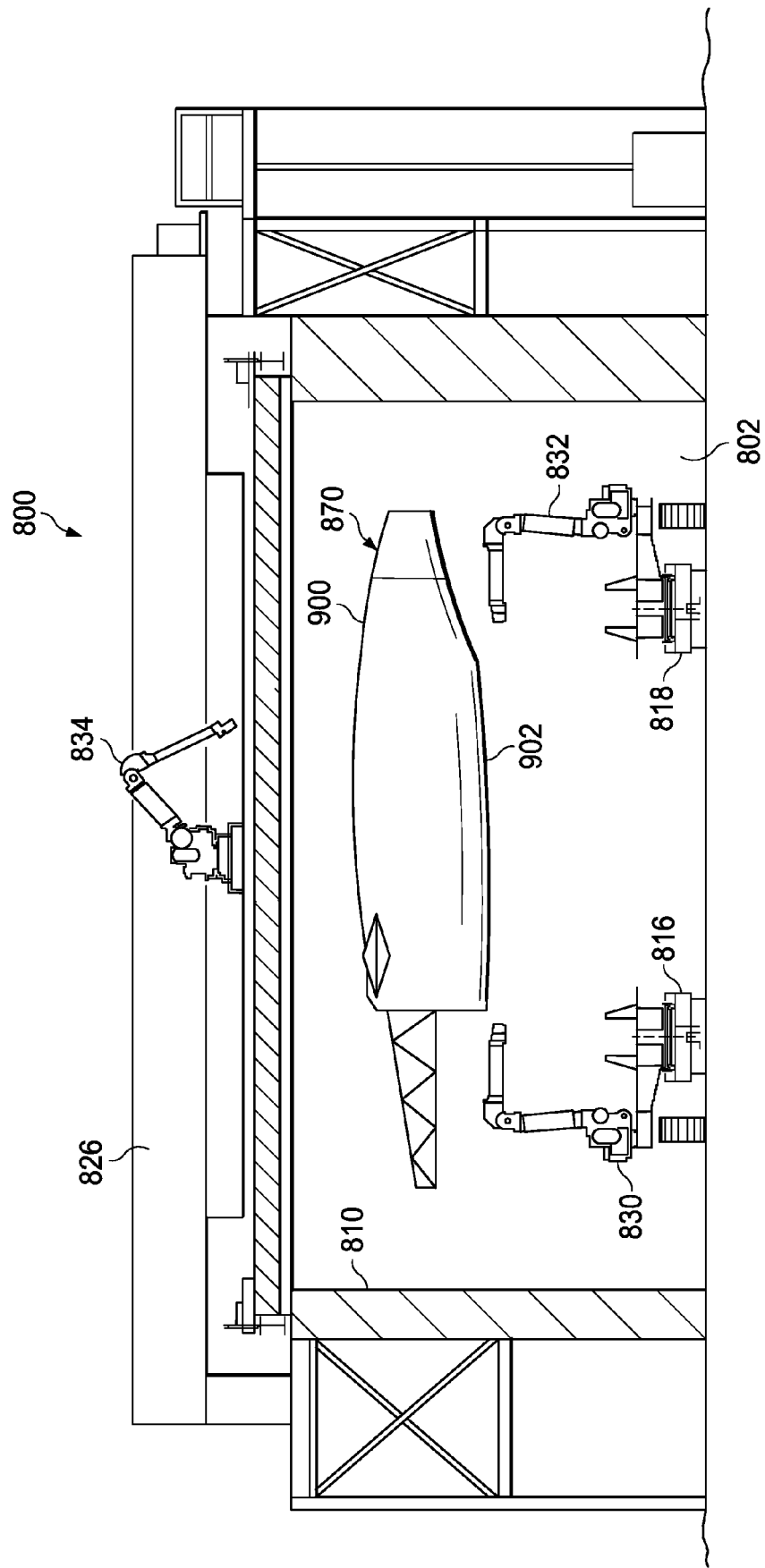
FIG. 9 is a diagram of a side view of an automated finishing system in accordance with an advantageous embodiment.

Turning now to FIG. 9, a side view of an automated finishing system is depicted in accordance with an advantageous embodiment. In this example, a side view of automated finishing system 800 shows robot 834 located over upper surface 900 of wing 870. Robots 830 and 832 are located underneath lower side 902 of wing 870.

The illustrations of finishing systems in FIGS. 6-9 are provided as example implementations for automated finishing system 302 in FIG. 3. These illustrations are not meant to limit the manner in which other advantageous embodiments may be implemented. These particular examples of lift systems are not meant to limit the manner in which other advantageous embodiments may be implemented.

For example, although the hydraulic lift systems are illustrated using jacks, other types of lift systems may be used. For example, without limitation, overhead cranes may be employed in the lift system, depending on the particular implementation. Further, in yet other advantageous embodiments, other numbers of finishing areas and booths may be present other than the two illustrated. For example, in some advantageous embodiments, only a single booth may be present.

In yet other advantageous embodiments, three, six, or some other number of booths and finishing areas may be present. Further, in some other advantageous embodiments, the wing may be moved from one booth to another booth to perform different operations in the same orientation.

Figure 10:
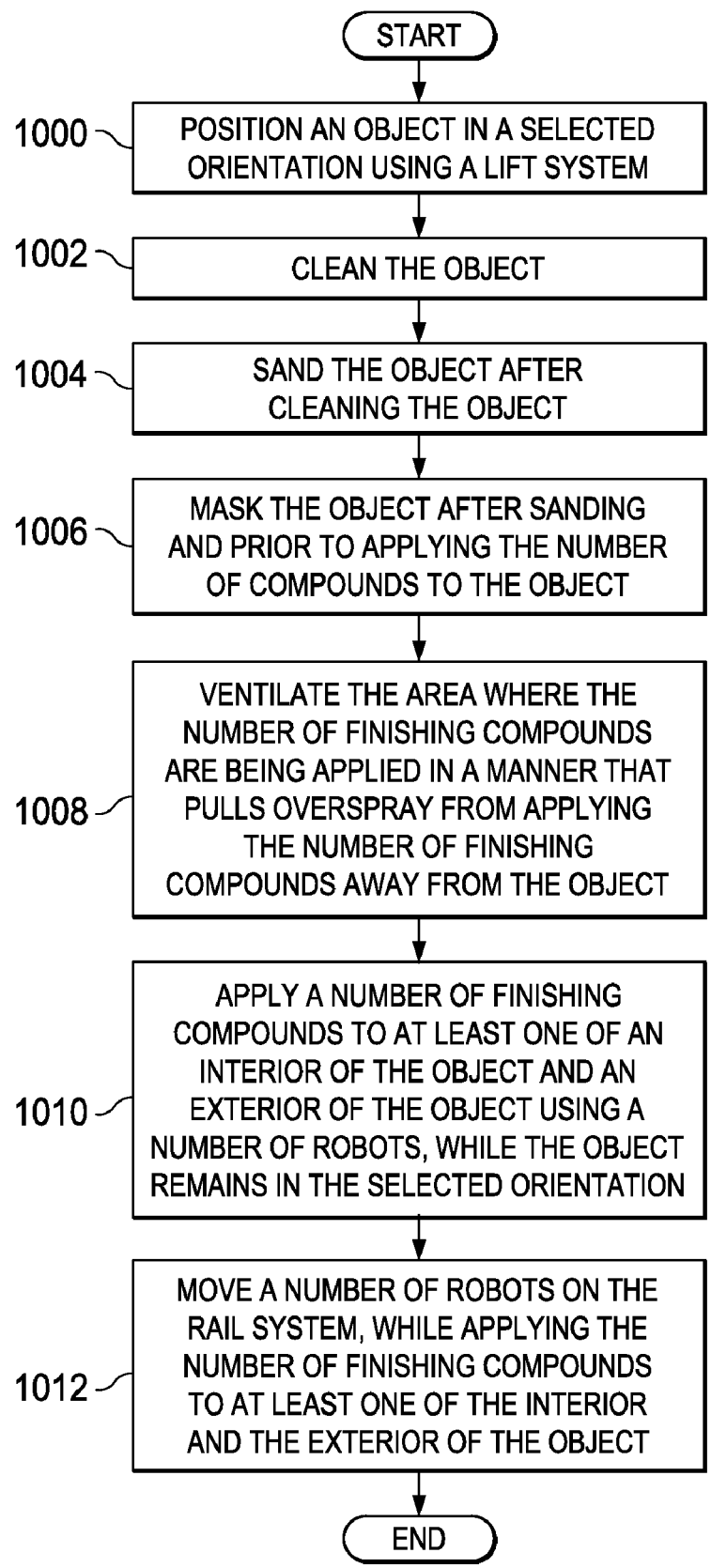
FIG. 10 is a flowchart of a process for processing an object in accordance with an advantageous embodiment.

Turning now to FIG. 10, a flowchart of a process for processing a wing is depicted in accordance with an advantageous embodiment. The process illustrated in FIG. 10 may be implemented in a finishing environment such as, for example, finishing environment 300 in FIG. 3.

The process begins by positioning an object in a selected orientation using a lift system (operation 1000). In these examples, the object may be any suitable object. For example, without limitation, the object may be a wing, an engine cowling, a fuselage, a rudder, a barrel, a tank, or some other suitable object. The selected orientation may be, for example, a substantially horizontal orientation, a substantially vertical orientation, or some other suitable orientation for applying finishing compounds and/or performing finishing operations. The substantially horizontal position may be a position slightly tilted from a true horizontal position to allow maximum water drainage.

The process then cleans the object (operation 1002). This cleaning may include using water and/or other solutions to prepare the object for finishing. The process then sands the object after cleaning the object (operation 1004). Next, the object is masked after sanding and prior to applying the number of compounds to the object (operation 1006). The process ventilates the area where the number of finishing compounds are being applied in a manner that pulls overspray from applying the number of finishing compounds away from the object (operation 1008).

Thereafter, a number of finishing compounds are applied to at least one of an interior of the object and an exterior of the object using a number of robots, while the object remains in the selected orientation (operation 1010).

In operation 1010, the applying operations may include applying a first finishing compound in the number of finishing compounds to the interior of the object and applying a second finishing compound in the number of finishing compounds to the exterior of the object, while the first finishing compound is curing. Of course, other combinations of finishing compounds and sequences of applications may be performed, depending on the particular implementation.

The process moves a number of robots on the rail system, while applying the number of finishing compounds to at least one of the interior and the exterior of the object (operation 1012), with the process terminating thereafter.

Figure 11:
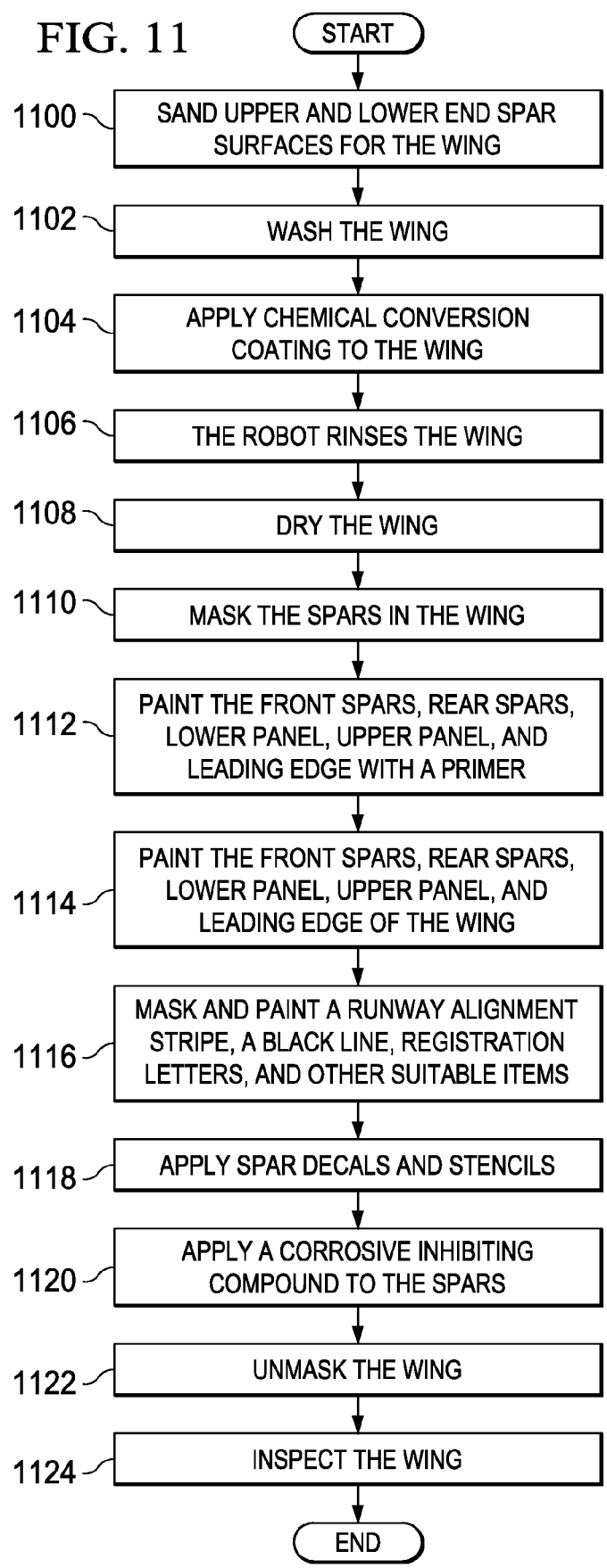
FIG. 11 is a flowchart of a process for finishing a wing in accordance with an advantageous embodiment.

Turning now to FIG. 11, a more detailed flowchart of a process for finishing a wing is depicted in accordance with an advantageous embodiment. The process illustrated in FIG. 11 may be implemented in a finishing environment such as, for example, finishing environment 300, using automated finishing system 302 in FIG. 3.

The process begins by sanding upper and lower end spar surfaces for the wing (operation 1100). These sanding operations may be performed by human operators and/or robots. Thereafter, the wing is washed (operation 1102). A chemical conversion coating is applied to the wing (operation 1104). This chemical conversion coating is applied to improve paint and sealant adhesion and to provide more corrosion protection. The chemical conversion coating may be, for example, alodine, an anodizing process, or some other suitable chemical conversion coating. Thereafter, the wing is rinsed by the robot (operation 1106).

The process then dries the wing (operation 1108). This operation also may be performed using robots blowing air on the wing with an appropriate tool.

Next, spars in the wing are masked (operation 1110). This masking may be performed by human operators and, in some implementations, by robots.

The process then paints the front spars, rear spars, lower panel, upper panel, and leading edge with a primer (operation 1112). One or more of these items painted in operation 1112 may be painted substantially in parallel by the robots on one or more wings at the same time.

The robots then paint the front spars, rear spars, lower panel, upper panel, and leading edge of the wing (operation 1114). One or more of these different locations may be painted simultaneously in operation 1114. The leading edge in operation 1114 may be painted with a synthetic fluoropolymer, such as polytetrafluoroethene. For example, the paint for the leading edge may use Teflon fluoropolymer resin paint, which may be available from Dupont.

The process then masks and paints a runway alignment stripe, a black line, registration letters, and other suitable items (operation 1116). The masking may be performed by human operators or by the robots. The painting, in these examples, is performed by the robots to obtain a more even thickness of the paint coat as compared to using human operators. The process then applies spar decals and stencils (operation 1118). Spar decals are placards that may be applied near valves, switches, and/or other electrical devices. These spar decals identify maintenance and/or operator instructions. Stencils are words, phrases, lines, measurement points, and/or other references that may be painted on the wing.

Next, a corrosive inhibiting compound is applied to the spars (operation 1120). A corrosive inhibiting compound may take various forms. For example, without limitation, a corrosive inhibiting compound may be paint, foam, an anodic inhibitor, a cathodic inhibitor, and/or some other suitable type of compound. The wing is then unmasked (operation 1122). The wing is then inspected (operation 1124), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for finishing an object. In the illustrative examples, the object takes the form of a wing. The different advantageous embodiments provide a capability to reduce the time and expense needed to finish an object, such as a wing. In the different advantageous embodiments, increased accuracy and reliability with respect to painting a wing may be present through the use of robots using spray guns to apply different types of finishing compounds. These finishing compounds may include, for example, water, paint, corrosion inhibiting compounds, and/or other components.

With the different advantageous embodiments, a more consistent thickness of paint may be applied as compared to currently used techniques in which human operators apply paint to the wing. Further, time may be reduced to finish a wing with a capability to perform various finishing operations simultaneously, as opposed to sequentially with currently available processes.

For example, the time needed to finish a wing may be reduced from five days using currently available processes and finishing environments to around 36 hours using one or more of the different advantageous embodiments.

Further, weight savings may be achieved through more uniform and controlled paint thicknesses that may be provided using robots as opposed to human operators with currently used processes. In other words, the thickness of the applied paint may be controlled to a higher degree with the use of robots for painting than with a manual paint process. These weight savings in an aircraft may be substantial weight savings for a wing, depending on the particular implementation.

Additionally, the different advantageous embodiments may require less space because only a single booth or area is required for a wing as opposed to three booths with other types of processes. In addition, the amount of paint that may be wasted and materials for masking also may be reduced using the different advantageous embodiments.

Further, the different advantageous embodiments may provide for a more efficient use of space. In the different illustrative examples, each finishing area may be used to perform all of the different finishing operations. As a result, a wing may be completely finished within a particular finishing area without requiring movement to another finishing area. Further, a reduction in the use of cranes to lift and move wings may be reduced by around over 80 percent as compared to currently used finishing processes and systems.

The different advantageous embodiments also may reduce the number of cures, masking operations, and spraying or application operations. As a result, reduced energy use, reduced use of perishable tools, and reduced chemical waste may be realized using one or more of the different advantageous embodiments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to parts for an aircraft, other advantageous embodiments may be applied to parts for other types of objects. For example, without limitation, other advantageous embodiments may be applied to parts for a mobile platform, a stationary platform, a land-based structure, an aquatic-based structure, a space-based structure and/or some other suitable object.

More specifically, the different advantageous embodiments may be applied to, for example, without limitation, parts for a submarine, a bus, a personnel carrier, a tank, a train, an automobile, a spacecraft, a space station, a satellite, a surface ship, a power plant, a dam, a manufacturing facility, a building and/or some other suitable object.

The embodiment or embodiments selected are chosen and described in order to best explain the principles of the embodiments and the practical application, and to enable others of ordinary skill in the art to understand the disclosure for various embodiments with various modifications as are suited to the particular use contemplated.

What is claimed is:

1. An automated finishing system comprising:
   a lift system capable of positioning a wing in a substantially horizontal position; and
   a number of robots capable of applying a number of finishing compounds to at least one of an interior of the wing and an exterior of the wing, while the wing remains in the substantially horizontal position.

2. The automated finishing system of claim 1 further comprising:
   a rail system, wherein the number of robots is capable of moving along the rail system when applying the number of finishing compounds to at least one of the interior and the exterior of the wing.

3. The automated finishing system of claim 1 further comprising:
   a ventilation system capable of pulling overspray of the number of finishing compounds downward, wherein the overspray is generated by at least one of the number of robots, while applying the number of finishing compounds to at least one of the interior and the exterior of the wing.

4. The automated finishing system of claim 1, wherein the lift system is capable of changing a height of the wing to apply the number of finishing compounds to an upper surface of the wing and to a lower surface of the wing.

5. The automated finishing system of claim 1, wherein the number of robots is capable of performing at least one of a sanding operation on the wing and a cleaning operation on the wing.

6. The automated finishing system of claim 1, wherein the number of robots is capable of applying the number of finishing compounds to the interior and the exterior of the wing simultaneously.

7. The automated finishing system of claim 1, wherein the number of finishing compounds is selected from at least one of a top coat paint, a primer, a corrosion inhibiting compound, and a waxy oil.

8. The automated finishing system of claim 2, wherein the wing is a first wing, a hydraulic system is capable of positioning a second wing, and the number of robots is further capable of moving along the rail system to apply the number of finishing compounds on the first wing and the second wing.

9. The automated finishing system of claim 1, wherein at least a portion of the number of robots is a number of mobile robots.

10. The automated finishing system of claim 2 further comprising:
a ventilation system capable of pulling overspray of the number of finishing compounds downward, wherein the overspray is generated by at least one of the number of robots, while applying the number of finishing compounds to at least one of the interior and the exterior of the wing.

11. The automated finishing system of claim 10, wherein the number of robots is capable of performing at least one of a sanding operation on the wing and a cleaning operation on the wing.

12. An apparatus comprising;
a lift system capable of positioning an object in a selected orientation; and
a number of robots capable of applying a number of finishing compounds to at least one of an interior of the object and an exterior of the object, while the object remains in the selected orientation.

13. The apparatus of claim 12 further comprising:
a ventilation system capable of pulling overspray of the number of finishing compounds downward, wherein the overspray is generated by at least one of the number of robots, while applying the number of finishing compounds to at least one of the interior and the exterior of the object.

14. The apparatus of claim 12 further comprising:
a rail system, wherein the number of robots is capable of moving along the rail system when applying the number of finishing compounds to at least one of the interior and the exterior of the object.

15. The apparatus of claim 12, wherein the number of robots is further capable of performing at least one of a sanding operation on the object and a cleaning operation on the object.

16. The apparatus of claim 12, wherein the object is selected from one of a wing, an engine cowling, a fuselage, a rudder, a barrel, and a tank.

17. A method for processing an object, the method comprising:
positioning the object in a selected orientation using a lift system; and
applying a number of finishing compounds to at least one of an interior of the object and an exterior of the object using a number of robots, while the object remains in the selected orientation.

18. The method of claim 17, wherein the applying step comprises:
applying the number of finishing compounds simultaneously to the interior and the exterior of the object using the number of robots, while the object remains in the selected orientation.

19. The method of claim 17 further comprising:
moving the number of robots on a rail system, while applying the number of finishing compounds to at least one of the interior and the exterior of the object using the number of robots.

20. The method of claim 17, wherein the applying step comprises:
applying a first finishing compound in the number of finishing compounds to the interior of the object; and
applying a second finishing compound in the number of finishing compounds to the exterior of the object, while the first finishing compound is curing.

21. The method of claim 17, wherein the object is a wing and the selected orientation is a substantially horizontal orientation.

22. The method of claim 17, wherein the object is a first wing and further comprising:
positioning a second wing in the selected orientation using the lift system; and
applying the number of finishing compounds to at least one of the interior of the second wing and the exterior of the second wing using the number of robots, while the second wing remains in the selected orientation.

23. The method of claim 22, wherein the number of finishing compounds is applied to the first wing and the second wing simultaneously.

24. The method of claim 17 further comprising:
cleaning the object;
sanding the object after cleaning the object; and
masking the object after sanding the object and prior to applying the number of finishing compounds.

25. The method of claim 17, wherein the number of finishing compounds is a first number of finishing compounds and further comprising:
allowing the first number of finishing compounds to cure; and
applying a second number of finishing compounds to the object after the first number of finishing compounds has cured.

26. The method of claim 17 further comprising:
ventilating an area in which the number of finishing compounds is being applied to the object in a manner that pulls overspray from applying the number of finishing compounds away from the object.

27. The method of claim 26, wherein the applying step comprises:
applying the number of finishing compounds to the interior and the exterior of the object using the number of robots, while the object remains in the selected orientation in a manner in which the overspray can be pulled away from the object.

28. The method of claim 17, wherein the object is a first wing and wherein the applying step comprises:
applying a first finishing compound in the number of finishing compounds to the first wing using the number of robots; and
applying a second finishing compound in the number of finishing compounds to a second wing using the number of robots, wherein the first finishing compound and the second finishing compound are applied substantially simultaneously.

29. The method of claim 28, wherein the first finishing compound is a paint and the second finishing compound is a corrosion inhibiting compound.

30. The method of claim 17, wherein the object is selected from one of a wing, an engine cowling, a fuselage, a rudder, a barrel, and a tank.

* * * * *